Oct. 23, 1923.

J. A. THOMSON 1,471,579

FOOT OPERATED ACCELERATOR FOR MOTOR VEHICLES

Filed May 8, 1922

Inventor:
James Alexander Thomson
By [signature]
Attorney

Patented Oct. 23, 1923.

1,471,579

UNITED STATES PATENT OFFICE.

JAMES A. THOMSON, OF MILDURA, VICTORIA, AUSTRALIA.

FOOT-OPERATED ACCELERATOR FOR MOTOR VEHICLES.

Application filed May 8, 1922. Serial No. 559,386.

*To all whom it may concern:*

Be it known that I, JAMES ALEXANDER THOMSON, a subject of the King of Great Britain and Ireland, and a resident of the post town of Mildura, in the parish of Mildura, county of Karkarooc, State of Victoria, Commonwealth of Australia (whose post office address is 11th Street, in the said post town of Mildura), have invented a certain new and useful Improved Foot-Operated Accelerator for Motor Vehicles, of which the following is a specification.

This invention relates to a foot operated accelerator for motor vehicles of the class in which the throttle of the engine is at present manipulated by a hand control mechanism only.

The object of the invention is to provide a simple, inexpensive and highly efficient device, which may be easily fitted to existing as well as to new vehicles, whereby an independent hand and foot adjustment of the throttle is provided so that the usual hand control lever on the steering wheel may be set to open the throttle to any desired degree and further adjustment of the throttle may then be readily effected by means of a foot pedal, the hands being thus left free to operate the steering wheel.

The invention is of distinct advantage at times when immediate acceleration of the engine is required during which time it is necessary for the driver to devote his attention to the steering of the vehicle and provides an inexpensive refinement for vehicles in which no foot accelerator is at present provided.

The invention consists briefly in the provision of a foot pedal located conveniently to the driver and connected to the throttle arm or lever of the carburetor and to a spring which is also connected to the existing hand control rod in such a manner that the throttle may be set at any desired position by the hand control and may be then further moved by operation of the foot pedal without altering the position of the hand control lever on the steering wheel. On relaxing the pressure on the foot pedal the spring causes the pedal and the throttle arm to return to their original position at which the throttle is set by the hand control.

Referring to the drawings which form part of this specification:—

Figure 1:
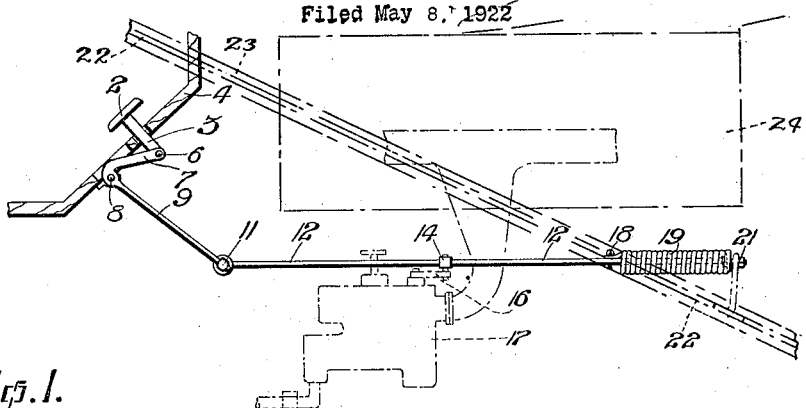
Figure 1 is a side elevation of the invention the carburetor and hand control rod being shown in dotted lines. The foot accelerator is in its normal position with the spring contracted.
Figure 2:
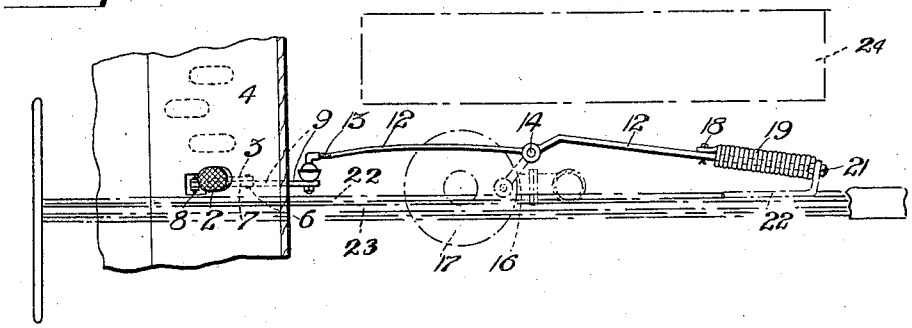
Figure 2 is a plan of Figure 1.
Figure 3:
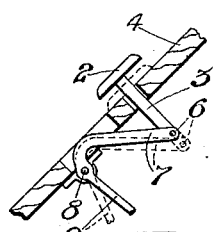
Figure 3 is an enlarged detail view of the foot pedal and bell crank lever to which it is attached. The parts are shown in normal position by full lines and in depressed position by dotted lines.
Figure 4:
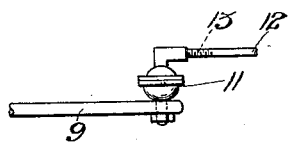
Figure 4 is a detail plan of the joint between the bell crank lever and the connecting rod.

More specifically the invention comprises a foot pedal 2 which is mounted on the rear end of a push rod 3 passing through a hole in the footboard 4 of the vehicle. The forward end of this push rod is pivoted at 6 to one arm 7 of a bell crank lever which is intermediately pivoted at 8 to the footboard or other convenient part of the vehicle.

The other arm 9 of the bell crank lever is attached preferably by a ball and socket joint 11 to the rear end of a connecting rod 12 which may be threaded at its rear end as at 13 to provide an adjustable connection at said joint. The intermediate portion of the said connecting rod is attached at 14 to the throttle arm or lever 16 of the carburetor 17.

Secured at 18 to said connecting rod near its forward end is the rear end of a coiled spring 19 into which the forward portion of the connecting rod passes and is adapted to move freely.

Figure 5:
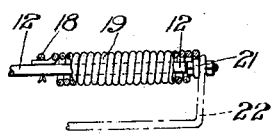
Figure 5 is an enlarged detail view showing the relative positions of the hand and foot control rods when the pedal is in normal position and the spring is contracted.
Figure 6:
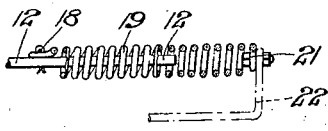
Figure 6 is a similar view showing the relative positions when the pedal is depressed to open the throttle and the spring is consequently extended.

The forward end of this spring is suitably secured at 21 to the aforesaid hand control rod 22 so that when the latter is moved in the usual manner to open the throttle the compressed spring 19 transmits the movement of the rod 22 to the connecting rod 12 which moreover abuts at its forward end against the rod 22 or fastening 21 as in Figure 5. The movement of the rod 22 is thus transmitted to the throttle arm 16 and the throttle is thus set in any desired position by manipulating the usual hand control lever on the steering wheel.

The engine is shown in dotted lines at 24 and the steering column is shown at 23. The hand control rod 22 is secured to the spring 19 at 21.

When it is desired to adjust the throttle by the foot pedal 2 the depression of the latter causes the connecting rod 12 to be drawn backwardly thus extending the spring 19 and opening the throttle further to provide the desired acceleration. The ball socket joint 11 permits of the necessary universal movement between the connecting rod 12 and the arm 9 due to the vertical swinging movement of the latter and the horizontal swinging movement of the throttle arm 16.

Immediately the pressure on the pedal is removed or relaxed the contraction of the spring 19 causes the throttle to close to the desired extent which is limited only by the position at which the throttle is set by the hand control lever as aforesaid.

It will thus be seen that by the special arrangement of the spring which is interposed between the hand control rod and the connecting rod of the foot pedal, an independent adjustment of the throttle by the hand and foot operated devices is provided.

The invention which is not liable to get out of order, may be easily fitted to the vehicle at but slight expense and with practically no alteration to existing parts such as the hand control devices.

Having now described my invention what I claim as new and desire to secure by Letters Patent is:—

1. An accelerator for motor vehicles comprising a foot pedal; a pivoted bell crank lever secured at one end to said foot pedal; a connecting rod secured at one end to the bell crank lever and secured intermediate of its ends to a throttle arm; and a spring for operatively securing said connecting rod to an arm of said hand control, whereby operation of the hand control causes movement of said connecting rod to open the throttle to a predetermined extent.

2. An accelerator for motor vehicles comprising a foot pedal; a pivoted bell crank lever connected at one end to said foot pedal; a connecting rod connected at one end to the bell crank lever and secured intermediate of its ends to a throttle arm; and a spring connected at one end to said connecting rod and the other end to an arm of the hand control rod.

3. An improved foot operated accelerator for motor vehicles consisting in the combination with a throttle arm, and a hand control rod for operating same, of a foot pedal, a connecting rod attached to the throttle arm and pivotally connected with the foot pedal, a coiled spring adapted to normally draw said connecting rod into operative engagement with the hand control rod so that an unyielding connection is formed between said rods when the hand control rod is moved to open the throttle said rods being separated by the extension of said spring on depression of the foot pedal whereby the connecting rod and throttle arm are moved to further open the throttle without moving the hand control rod.

4. An improved foot operated accelerator for motor vehicles consisting in the combination with a throttle arm and a hand control rod, for operating same of a foot pedal, a connecting rod attached to said throttle arm, a universal joint for coupling said connecting rod to the foot pedal and a normally compressed spring interposed between said connecting rod and the hand control rod for the purpose set forth.

5. An improved foot operated accelerator for motor vehicles consisting in the combination with a throttle arm and a hand control rod for operating same of a foot pedal, a bell crank lever connected to said pedal, a connecting rod intermediately attached to the throttle arm and pivotally connected at its rear end to the bell crank lever and a normally compressed spring surrounding the forward portion of said connecting rod, said spring being fastened at its rear end to said connecting rod and at its forward end to the hand control rod for the purpose set forth.

6. An improved foot operated accelerator for motor vehicles consisting in the combination with a throttle arm and a hand control rod for operating same, of a foot pedal, a push rod carrying said pedal, a bell crank lever attached to said push rod, a connecting rod intermediately attached to the throttle arm a universal joint between said connecting rod and bell crank lever and a coiled spring interposed between the forward portion of the connecting rod and the hand control rod and adapted to normally draw said rods together for the purpose set forth.

7. An accelerator for motor vehicles comprising a foot pedal; a connecting rod connected intermediate of its ends to a throttle arm; means for connecting one end of said rod to said foot pedal; and a spring connected at one end to the free end of said connecting rod and the other end to an arm of a hand control rod, said spring being adapted to pull said connecting rod to said hand control rod.

In testimony whereof I affix my signature.

J. A. THOMSON.

Witness:
H. L. RUTHERFORD.